United States Patent Office.

SAMUEL B. HENRY, OF BRIDGEPORT, CONNECTICUT.

Letters Patent No. 73,603, dated January 21, 1868.

---

IMPROVEMENT IN ARTICLES MADE OF MOULDED WOOD.

---

The Schedule referred to in these Letters Patent and making part of the same.

---

TO ALL WHOM IT MAY CONCERN:

Be it known that I, SAMUEL B. HENRY, of Bridgeport, Fairfield county, Connecticut, have invented an Improvement in Articles Made of Moulded Wood; and I do hereby declare the following to be a full, clear, and exact description of the same.

My invention consists of blocks or strips of wood which are moulded so as to produce imitations of carved or turned objects of utility and ornament, the said blocks or strips being prevented from absorbing moisture, and retained in the shape imparted to them, by being impregnated with a suitable composition or material.

In order to enable others skilled in the art to practise my invention, I will now proceed to describe the manner of carrying the same into effect.

Blocks or strips of wood, from which the articles of utility or ornament are to be manufactured, are subjected to the action of dies, applied to the end grain of the wood. After the blocks or strips have thus been moulded between the dies, they are removed, and trimmed, if necessary, they are then impregnated in a suitable manner with a solution of India rubber, are dried, and then immersed for a short time in chloride of sulphur, or its equivalent.

Articles of wood, moulded as above described, and the pores of which are filled with a material or composition such as that specified, permanently retain their shape and sharpness of outline, as the wood is not affected by moisture, and is not liable to warp, the fibres being fixed in the position imparted to them by the dies.

Without confining myself to the mode herein described of coating or impregnating the wood, or the use for this purpose of the materials specified, and without claiming broadly an article made by dies, applied to the end grain of a block or strip of wood,

I claim as my invention, and desire to secure by Letters Patent—

A block or strip of moulded wood, the fibres of which have been displaced by the action of dies applied to the end grain, as described, and the pores of which are filled with rubber, or its equivalent, applied in solution.

In testimony whereof, I have signed my name to this specification in the presence of two subscribing witnesses.

SAML. B. HENRY.

Witnesses:
   CHARLES E. FOSTER,
   W. J. R. DELANY.